United States Patent [19]

Preuss et al.

[11] Patent Number: 5,266,357
[45] Date of Patent: Nov. 30, 1993

[54] PROCESS FOR ENAMELLING ALUMINUM-COATED STEEL PLATE AND ENAMELLED STEEL PLATE

[75] Inventors: Leo Preuss, Zeebruegge; Hans Hoffmann, Bruegge, both of Belgium

[73] Assignee: Email Brugge N.V., Brugge, Belgium

[21] Appl. No.: 905,326

[22] Filed: Jun. 29, 1992

[30] Foreign Application Priority Data

Jul. 10, 1991 [DE] Fed. Rep. of Germany ....... 4122763

[51] Int. Cl.$^5$ .............................................. B05D 3/02
[52] U.S. Cl. .............................. 427/376.5; 427/376.4; 427/376.2; 427/419.2
[58] Field of Search ............... 427/376.2, 376.4, 376.5, 427/397.7, 190, 193

[56] References Cited

U.S. PATENT DOCUMENTS

| | | | |
|---|---|---|---|
| 4,147,835 | 4/1979 | Nishino et al. | 428/450 |
| 4,180,482 | 12/1979 | Nishino et al. | 252/455 R |
| 4,460,630 | 7/1984 | Nishino et al. | 427/376.5 |

FOREIGN PATENT DOCUMENTS

| | | |
|---|---|---|
| 0453897 | 10/1991 | European Pat. Off. |
| 2400876 | 3/1979 | France |
| 2565224 | 12/1985 | France |

OTHER PUBLICATIONS

Derwent Database, JP 61 091 040, May 9, 1986.
Derwent Database, JP 60 197 885 Oct. 7, 1985.
"Erfahrungen mit der industriellen Emaillierung von Aluminum", Glas-Email-Kermao Technik 14 (1963), p. 1.
Mitteilungen VDE, 24, pp. 99-102 (1976).
Email und Emailler-technik, p. 146.

Primary Examiner—Shrive Beck
Assistant Examiner—David M. Maiorana
Attorney, Agent, or Firm—Connolly and Hutz

[57] ABSTRACT

A process is disclosed for enamelling an aluminum-coated steel plate using a novel enamel slip. The enamel slip contains low-melting enamel frit, a high melting inorganic oxidic powder, and an oxide of copper or iron.

7 Claims, No Drawings

PROCESS FOR ENAMELLING ALUMINUM-COATED STEEL PLATE AND ENAMELLED STEEL PLATE

The enamelling of steel plates for various applications at firing temperatures of 780° to 950° C. is known, as is the enamelling of aluminum with special enamels for firing at temperatures in the range from 530° to 570° C., i.e. well below the melting point of aluminum.

The enamelling of hot-dip-aluminized or aluminum-plated steel plates with products which are suitable for the enamelling of aluminum and which also require firing temperatures of 560° C. is also known. In this particular process, adhesion of the enamel can be adversely affected by Fe-Al alloys formed on the surface by prolonged or excessive firing (D. Ziesche: Glas-Email-Keramo Technik 14 (1963), page 1). The above-mentioned special enamels for aluminum, which may also be used for the enamelling of aluminum-coated steel plates, soften during firing, but do not flow entirely smoothly in the same way as steel or cast enamels for example. As a result, surface quality is dependent to a large extent on the method of application so that uneven surfaces, in some cases very uneven surfaces, are formed. On account of the low firing temperatures for aluminum enamels, the chemical and mechanical resistance values of the surfaces of typical enamel coatings on aluminum are of course limited (W. Warnecke and H.-W. Birmes: Mitteilungen VDEfa 24 (1976), pages 99 to 102). Accordingly, the use of aluminum enamelling has remained relatively limited by comparison with steel plate enamelling.

The processing of steel plate enamels with good adhesion to aluminized or aluminum-plated steel appeared impossible in the prior art because the known adhesion mechanisms based on electrochemical corrosion of the steel surface by nickel and/or cobalt compounds are blocked by the aluminum layer and are thus unable to act in the usual way.

It has now been found that aluminum-coated steel plates can be enamelled at firing temperatures of 800° to 850° C., provided that enamel frits which pass into the glass flux at low temperatures, i.e. sufficiently below the melting temperature of aluminum, are used and further provided that high-melting inorganic oxidic materials, which dissolve at least partly in the glass flux during firing with an increase in its viscosity, are present and further provided that adhesion of the enamel is not affected by the intermetallic aluminum/iron phases which form beyond 700° C. (alitizing). This is achieved by further addition of oxides of copper and/or iron to the enamel slip.

The enamel coatings obtained in this way are eminently suitable as such as decorative coatings, for example for school tables by virtue of their roughness or as self-cleaning enamel coatings.

Accordingly, the present invention relates to a process for enamelling aluminum-coated steel plate which is characterized by a) application of an enamel slip containing
  I. at least one low-melting enamel frit which passes into the glass flux below 600° C.,
  II. at least one high-melting inorganic oxidic powder having a melting temperature above 900° C. which dissolves at least partly in the molten low-melting enamel (I) with an increase in viscosity in the enamel and
  III. at least one of the oxides of copper or iron,
b) drying of the enamal slip and
c) firing at 800° to 850° C.

The present invention also relates to an enamel slip which is characterized by containing the constituents mentioned above under a).

The high-melting inorganic oxidic powder should preferably be present in a quantity of 100 to 200% by weight and, more preferably, in a quantity of 120 to 150% by weight, based on the quantity of the low-melting enamel frit.

Suitable high-melting inorganic oxidic powders are, in particular, powders having high aluminum oxide and silicon dioxide contents, such as porcelain powder or aluminum silicates, such as zeolite powder. Other suitable high-melting inorganic oxidic powders are zirconium (zirconium silicate), titanium dioxide or $SiO_2$ which may advantageously be used in combination with the aluminum silicates mentioned.

Any of the known aluminum enamels may be used as the low-melting enamel frits. However, aluminum enamels of high lead oxide content are less preferred. Aluminum enamels having a high vanadium pentoxide content are particularly preferred. Particularly preferred low-melting enamels have the following oxidic composition:

$SiO_2$: 30 to 35% by weight
$Na_2O$: 17 to 23% by weight
$K_2O$: 8 to 14% by weight
$TiO_2$: 18 to 25% by weight
$V_2O_5$: 7 to 10% by weight
$Li_2O$: 0.5 to 2% by weight
$P_2O_5$: 1 to 2.5% by weight
$Al_2O_3$: 0.5 to 1.5% by weight
$Al_2O_3$: 0.5 to 1.5% by weight According to the invention, the iron and/or copper oxide used in the enamel slip should preferably be present in a quantity of 30 to 70% by weight and, more preferably, in a quantity of 40 to 60% by weight, based on the quantity of low-melting enamel frit.

In addition, the enamel slip contains typical grinding, standardizing and slip auxiliaries.

The slip mixtures are ground in such way that grinding finenesses of 5 to 10 are obtained in the Bayer test (Lit.: Pöschmann: Email und Emailliertechnik, page 146) using a 40 μm mesh sieve (16,900 meshes/m²).

The enamel slip obtained may be applied in known manner either electrophoretically or by spraying.

If it is intended to apply only a single coating, the weight of the coating after drying may be between 400 and 550 g/m².

Firing is carried out using any conventional means, preferably at a temperature of 800° to 850° C. and with a residence time in the furnace of 3 to 7 minutes.

The enamel slip according to the invention is suitable for two-coat enamelling in the same way as base enamel slips, a typical steel plate enamel, for example titanium white enamel or transparent enamel with pigments or special enamels developed for steel plate enamelling, being suitable as the surface enamel coating.

Where the enamel slip according to the invention is used as base enamel in two-coat enamelling, the enamel slip is preferably applied in a dry coating weight of 50 to 100 g/cm².

The process according to the invention for enamelling aluminum-coated steel plate is suitable for two-coat two-fire enamelling and, in many cases, for two-coat single-fire enamelling.

It has been found that the slip free from cobalt and nickel oxide can be applied to unpretreated aluminized steel plate with no disadvantages in adhesion of the enamel.

Where steel plates coated with aluminum on both sides are enamelled on only one side, a highly corrosion-resistant intermetallic Al/Fe layer, more particularly an Al₃Fe layer, is formed on the non-enamelled side during firing, so that there is no need for the non-enamelled back of the steel plate to be surface-treated. In addition, the aluminum-coated steel plates enamelled in accordance with the invention have advantages over conventionally enamelled steel plate in regard to their corrosion behavior along cut edges because, when the steel plate is cut or stamped, the aluminum is drawn completely or partly over the edges so that, if they have not been enamelled, the edges are also protected against corrosion by the Al₃Fe layer formed during firing.

By firing at temperatures above 700° C., the aluminum layer is completely converted by alitizing into intermetallic aluminum/iron phases so that, even if the enamel coating is damaged by impact or blows directed against the steel, it remains protected against corrosion.

Accordingly, the present invention provides a new material which, in addition to the advantages of conventional steel plate enamelling, also shows increased protection against corrosion despite any enamelling errors or despite damage.

Accordingly, the present invention also relates to an enamelled steel plate which is characterized by an interlayer consisting of intermetallic phases of the aluminum/iron system and an enamel layer having a softening point above 500° C.

The following Examples are intended to illustrate the invention without limiting it in any way:

EXAMPLES

Example 1

After degreasing, parts of commercially available Al-plated steel are sprayed on one side with a coating of primer and then dried. The slip required for application of this coating is prepared by grinding of an enamel (A) suitable for the enamelling of aluminum, which has the following composition:

33% by weight $SiO_2$
20.5% by weight $Na_2O$
12% by weight $K_2O$
22% by weight $TiO_2$
8.5% by weight $V_2O_5$
1.5% by weight $Li_2O$
1.5% by weight $P_2O_5$
1% by weight $Al_2O_3$, with addition of the following additives in a ball mill:

| | | |
|---|---|---|
| enamel A | 35 | parts |
| porcelain powder | 50 | parts |
| iron oxide | 15 | parts |
| blue clay | 5 | parts |
| bentonite | 0.3 | part |
| Mg silicate hydrate (Bentone EW) | 0.3 | part |
| Na carboxymethyl cellulose | 0.2 | part |
| boric acid | 0.8 | part |
| water | 65.0 | parts |

The specific gravity d of the suspension is adjusted to 1.60 and the fineness of grinding (as measured by the BAYER method) should be between 7 and 10 (sieve with 16,900 meshes/cm²). The suspension is thinly applied to the substrate (dry coating weight 50 to 100 g/m²). The coating obtained after drying is fired for 5 minutes at 820° C. A white enamel suspension suitable for the coating of primed steel plates is then applied as surface enamel to this primer coat in the usual way. The following enamel (B), for example, is a suitable white enamel:

38–47% by weight $SiO_2$
14–20% by weight $TiO_2$
14–18% by weight $B_2O_3$
8–12% by weight $Na_2O$
3–6% by weight $K_2O$
0.5–1.5% by weight $Li_2O$
0–3.5% by weight $F_2$
0.5–3% by weight $Al_2O_3$,
1–3% by weight $P_2O_5$
0.5–1.5% by weight $MgO$ To obtain a sprayable suspension, the enamel B is ground in a ball mill in the presence of the following additives:

| | | |
|---|---|---|
| enamel B | 100 | parts |
| blue clay | 5 | parts |
| bentonite | 0.3 | part |
| Mg silicate hydrate (Bentone EW) | 0.3 | part |
| Na carboxymethyl cellulose | 0.2 | part |
| water | 60 | parts |

0.1 Part potassium carbonate may optionally be added as extender. The specific gravity of the suspension should be of the order of 1.60 while the fineness of grinding (as measured by the BAYER method) is 5 to 7 (sieve with 16,900 meshes/cm²).

Drying of the spray coating is followed by firing in the usual way for steel plate white enamels (residence time in the furnace: 3.5 minutes at 820° C.). After cooling, a defect-free white enamel is formed on the front while a dark-grey corrosion-resistant Al₃Fe layer is formed on the back of the steel plate.

Example 2

As Example 1, except that the Al-plated steel plate is enamelled on both sides. After the second firing in the described manner, a satisfactory white enamel coating is formed on both sides, showing particular resistance to corrosion by virtue of the underlying Al₃Fe layer.

Example 3

As Example 1 or 2 except that the iron oxide used in the primer coat was replaced by copper oxide. Enamel coatings of comparable quality are obtained.

Example 4

As Examples 1, 2 and 3, except that a colored enamel coating—in this case colored blue by a Co oxide blue pigment—is produced as the surface enamel. In this case, the surface enamel suspension is formed by grinding of a transparent enamel (C) having the following oxidic composition:

48–57% by weight $SiO_2$
12–16% by weight $Na_2O$
7–12% by weight $TiO_2$
11–17% by weight $B_2O_3$
1–6% by weight $K_2O$
0.5–2% by weight $Li_2O$ 1–8% by weight CaO
2–5% by weight F$_2$
in the presence of additives corresponding to the following mill batch:

| enamel C | 100 parts |
| --- | --- |
| blue clay | 5 parts |
| bentonite | 0.3 part |
| Mg silicate hydrate (Bentone EW) | 0.3 part |
| Na carboxymethyl cellulose | 0.2 part |
| Co oxide blue pigment | 3 parts |
| water | 60 parts |
| fineness of grinding 7–10 | (16,900 M/cm$^2$). |

The surface enamel coating is fired at 820° C. (3.5 mins.).

Example 5

After degreasing, parts of commercially available aluminized steel are provided with a decorative matt single-layer enamel coating. The enamel slip used for this purpose is prepared by grinding the following products in a ball mill:

| enamel A (as Example 1) | 35 parts |
| --- | --- |
| copper oxide (CuO) | 20 parts |
| zeolite | 45 parts |
| blue clay | 5 parts |
| bentonite | 0.3 part |
| Mg silicate hydrate (Bentone EW) | 0.3 part |
| Na carboxymethyl cellulose | 0.2 part |
| boric acid | 0.8 part |
| pigment Rutilgoldocker (Cr and Sb-containing rutile pigment) | 2 parts |
| water | 65 parts |

The suspension (d=1.60, fineness of grinding 7–10, 16,900 M/cm$^2$) is applied by spraying. After drying and firing at 830° C. (5 minutes), a light green, matt defect-free enamel coating is obtained. The non-enamelled back is covered with the dark-grey, corrosion-inhibiting Al$_2$Fe layer already described in Example 1.

Example 6

Workpieces of aluminized steel which are to be provided with a self-cleaning coating are sprayed or even electrophoretically coated with a suspension formed by grinding of the following components in a ball mill:

| enamel A (as in Example 1) | 35 parts |
| --- | --- |
| porcelain powder | 50 parts |
| iron oxide (Fe$_2$O$_3$) | 15 parts |
| blue clay | 5 parts |
| bentonite | 0.3 part |
| Mg silicate hydrate (Bentone EW) | 0.3 part |
| boric acid | 0.8 part |
| Na carboxymethyl cellulose | 0.2 part |
| water | 65 parts |

The coating weight (dry) is 400 to 550 g/m$^2$. If the coating is applied electrophoretically, there is no need for the otherwise usual addition of Na aluminate solution. The described slip has an initial conductivity of more than 10,000 microsiemens.

After drying and firing at 820° C. (5 mins.), a coating having an adequate soft-cleaning effect is obtained, being suitable for example for grill accessories (4–5 cycles according to ISO 8292).

Example 7

A surface coating with an improved self-cleaning effect compared with the coating described in Example 6 can be produced by the two-coat/single-fire method. In this case, a second coat (coating weight approx. 300 to 400 g/m$^2$) is applied to the first coat described in Example 6 (coating weight 50 to 100 g/m$^2$) without intermediate firing. The suspension required for this purpose is produced by grinding of the following components in a ball mill:

| enamel D | 25 parts |
| --- | --- |
| porcelain powder | 75 parts |
| blue clay | 5 parts |
| Mg silicate hydrate (Bentone EW) | 0.3 part |
| Na carboxymethyl cellulose | 0.2 part |
| boric acid | 0.8 part |
| water | 65 parts |

(d=1.70; fineness of grinding 10; sieve with 16,900 meshes/cm$^2$).

Enamel D has the following composition:
70–77% by weight SiO$_2$
10–15% by weight Al$_2$O$_3$,
3–6% by weight Fe$_2$O$_3$
0.5–2% by weight Li$_2$O
4–7% by weight P$_2$O$_5$
2–4% by weight MnO After drying together, the two coats are fired together for 5 minutes at 820° C. A enamel coating having an excellent self-cleaning effect is formed (8–10 cycles according to ISO 8292).

What is claimed is:

1. A process for enamelling aluminum-coated steel plate which comprises
   a) applying into contact with the plate an enamel slip which contains
      I. at least one low-melting enamel frit:
      II. at least one high-melting inorganic oxidic powder having a melting temperature above 900° C. which dissolves at least partly in the molten low-melting enamel (I) with an increase in viscosity; and
      III. 30–70% by weight based on the low-melting enamel frit of at least one of the oxides of copper or iron:
   b) drying the enamel slip; and
   c) firing at 800° to 850° C.

2. A process as claimed in claim 1, wherein the enamel slip contains the high-melting inorganic oxidic powder in a quantity of 100 to 200% by weight based on the low-melting enamel frit.

3. A process as claimed in claim 2, wherein the enamel slip contains 120 to 150% by weight of inorganic oxidic powder.

4. A process as claimed in claim 1, wherein the enamel slip contains the metal oxide in a quantity of 30 to 70% by weight based on the low-melting enamel frit.

5. A process as claimed in claim 4, wherein the enamel slip contains 40–60% by weight of at least one of the oxides of copper or iron.

6. A process as claimed in claim 1, wherein porcelain powder or zeolite powder is used as the inorganic oxidic powder.

7. A process as claimed in claim 1, wherein a steel plate surface enamel is additionally applied to the plate using a two-coat single-fire process or a two-coat two-fire process.

* * * * *